Patented Dec. 13, 1938

2,140,455

UNITED STATES PATENT OFFICE 2,140,455

PREPARATION OF DYESTUFFS OF THE DIBENZANTHRONE SERIES

Edward T. Howell, Milwaukee, Wis., assignor to E. I. du Pont de Nemours & Company, Wilmington, Del., a corporation of Delaware No Drawing. Application July 24, 1937, Serial No. 155,564

3 Claims. (Cl. 260—355)

This invention relates to the preparation of dyestuffs of the dibenzanthrone series and more particularly to a new and improved process for the alkylation of dihydroxydibenzanthrone wherein the alkylation is effected in nitrobenzene or equivalent solvent, such as nitrotoluene, etc., with alkyl sulfates.

In the original process for the preparation of dimethoxy- and diethoxydibenzanthrones (see for instance U. S. Patent 1,531,261), the alkylation of the dihydroxydibenzanthrones was carried out in nitrobenzene with alkyl sulfates in the presence of sodium carbonate as the acid binding agent. The resulting dimethoxydibenzanthrone (Example 1) dyes cotton in bluish green shades. The diethoxydibenzanthrone prepared by this process (Example 5) dyes cotton in bluish violet shades.

It is known that pure dimethoxydibenzanthrone dyes cotton in bluish green shades of excellent fastness properties, but considerable difficulty has been experienced in obtaining a pure dimethoxydibenzanthrone when the methylation is carried out in nitrobenzene with dimethyl sulfate in the presence of sodium carbonate, as more particularly described in Example 1 of U. S. Patent 1,531,261. Due to the side reactions which apparently take place in the reaction causing the formation of impurities which dye in extremely bluish green shades, the final dyestuff is deficient in tinctorial power and dyes in somewhat more bluish green than is desirable. Complete methylation of the dihydroxydibenzanthrone when sodium carbonate is employed is often impossible, due apparently to a side condensation, so that the shade of consecutive batches of color vary widely. Even the pure dimethoxydibenzanthrone dyes in very bluish green shades, so that increased blueness of the color due to improper methylation is to be avoided, and every endeavor is made to obtain a product that will dye as near the shade of the pure dimethoxydibenzanthrone as possible.

After a number of years of research which has been carried out in an attempt to improve both the yield and dyeing properties of the dimethoxydibenzanthrone obtained by the dimethyl sulfate process, applicant has found that if potassium carbonate is substituted for sodium carbonate in the process consistently higher yields of a dimethoxydibenzanthrone are obtained, which dye cotton in somewhat yellower shades of bluish green than the product normally obtained according to Example 1 of U. S. Patent 1,531,261. Applicant has also found that on the substitution of potassium carbonate for sodium carbonate in the ethylation of dihydroxydibenzanthrone in nitrobenzene with diethyl sulfate, a very desirable greenish blue dyestuff can be obtained in good yields, the shade of the resulting dyestuff being materially different from that of the product originally described in U. S. Patent 1,531,261. This discovery was surprising in view of the fact that the substitution of potassium carbonate for sodium carbonate as an acid binding agent in this type of condensation reaction does not ordinarily change the characteristics of the resulting compound. In fact, in the alkylation of the same dihydroxydibenzanthrone where alkyl halides are employed as the alkylating agents or where the alkyl ester of ptoluene sulfonic acid is used, the substitution of potassium carbonate for sodium carbonate has not been found to give improved results.

It is therefore an object of this invention to provide a process for the methylation of dihydroxydibenzanthrone in nitrobenzene or equivalent solvent with dimethyl sulfate by a procedure which will give consistently yellower and brighter shades than are normally obtained by the process of U. S. Patent 1,531,261.

It is a further object of the invention to provide a simple and more economical process for the preparation of diethoxydibenzanthrone in which the ethylation is carried out in nitrobenzene or equivalent solvent with an ethyl sulfate, to give a product that dyes cotton in bluish green shades of excellent fastness properties.

According to my process the dihydroxydibenzanthrone, or partially alkylated dihydroxydibenzanthrone, is suspended in a nitrobenzene with finely divided potassium carbonate or bicarbonate and heated to alkylating temperatures with dimethyl sulfate (from 60 to 160° C. preferred, although higher temperatures may be employed). When diethyl sulfate is used, somewhat higher temperatures may be employed.

This process is also applicable to the preparation of mixed ethers wherein one alkyl group may be introduced into the dihydroxydibenzanthrone molecule by any desired process, with subsequent completion of the alkylation in nitrobenzene using dimethyl or diethyl sulfate in the presence of potassium carbonate. The free hydroxydibenzanthrone or the mono or disodium or potassium salt of the same may be employed as the starting material.

The following examples are given to illustrate the invention more fully. The parts used are by weight.

Example 1

An aqueous cake equivalent to 50 parts of dihydroxydibenzanthrone (obtained according to U. S. Patent 1,866,501 or U. S. Patent 1,910,603) is heated in 500 parts of nitrobenzene with 25 parts of potassium carbonate dissolved in 25 parts of hot water under reflux of nitrobenzene, until practically all the water has been driven out and the temperature has risen to 150–160° C. After allowing to cool to 60° C. or less, 90 parts of dry finely pulverized potassium carbonate are added, and the temperature is raised to 160° C. and held while 60 parts of dimethyl sulfate are slowly added. When tests indicate complete reaction, the mixture is allowed to cool to 25–30° C., then filtered and washed with several portions of nitrobenzene. The filter cake is steam distilled free of solvent and the product which may then be isolated by an aqueous filtration gives dyeings of excellent strength and great purity of shade.

Similar results are also obtained if potassium bicarbonate is used in this example instead of potassium carbonate.

Example 2

26 parts of finely pulverized potassium salt of hydroxydibenzanthrone (obtained according to Example 2 of U. S. Patent 1,950,366, using KOH instead of NaOH and starting from the initial material produced according to U. S. Patent 1,910,603) suspended in 375 parts of nitrobenzene are heated to 160° C. with 45 parts of potassium carbonate and treated during the course of 2 to 3 hours with 30 parts of dimethyl sulfate. The reaction product, which is isolated as in Example 1, is of the same purity.

Example 3

The same procedure is followed as in Example 1 with the exception that 75 parts of diethyl sulfate are added at 180–185° C. instead of 60 parts of dimethyl sulfate at 160–165° C. Crude diethoxydibenzanthrone is so obtained in a relatively high state of purity, which dyes cotton in bright bluish green shades, somewhat bluer than the corresponding dimethoxydibenzanthrone.

Example 4

50 parts of dichlorodihydroxidibenzanthrone (obtained according to German Patent 546,678) are treated as in Example 1, giving a product which dyes cotton in bright blue shades.

Example 5

50 parts of the hydroxydibenzanthrone derivative obtained according to Example 18 of British Patent 401,645 omitting the treatment with alkaline hydrosulfite (oxidation product of the condensation product of dibenzanthrone with 1-chloroanthraquinone-2-carbonyl chloride, followed by reduction with bisulfite), are methylated as in Example 1. The product so obtained dyes cotton in bright green shades.

Example 6

10 parts of the potassium salt of dihydroxydibenzanthrone and 15 parts of potassium carbonate are suspended in 100 parts of nitrobenzene and treated at 175–180° C. with 20–25 parts of beta, beta'-dichlorodiethyl sulfate added in portions during 2 to 3 hours. The reaction mixture is cooled and filtered. The crude product when free from nitrobenzene dyes in cotton in bright navy blue shades.

Example 7

50 parts of hydroxymethoxydibenzanthrone in the form of an aqueous paste are dehydrated as in Example 1 in 500 parts of nitrobenzene with 12.5 parts of potassium carbonate dissolved in water. After the dehydration, the mixture is cooled, 32.5 parts of finely powdered potassium carbonate are added, and the temperature raised to 160° C. 37.5 parts of diethyl sulfate are then added in portions during a period of 1 to 2 hours. After cooling, the reaction mixture is filtered. The methoxyethoxydibenzanthrone, which is isolated as in Example 1, is of high technical purity and dyes cotton in bluish green shades.

Example 8

An aqueous cake equivalent to 40 parts of dihydroxydibenzanthrone is heated with a potassium carbonate solution in 400 parts of nitrobenzene as in Example 1. The mass is cooled to 50° C. or lower. 72 parts of finely powdered anhydrous potassium carbonate and then 48 parts of dimethyl sulfate are added, and the reaction mixture is heated to 150° C. during about one hour. Additional amounts of dimethyl sulfate are added if tests indicate incomplete reaction. The product may be isolated by filtration or steam distillation followed by filtration as in Example 1.

The reaction is preferably carried out in at least 10 parts of nitrobenzene for each part of dry dihydroxydibenzanthrone. The use of potassium carbonate has been found to permit a 50% reduction in the amount of nitrobenzene used in the reaction over the amount that has been found to be most suitable with sodium carbonate, thereby making possible a material increase in the production of the color per unit of equipment. It also permits the use of a less pure dihydroxydibenzanthrone than can be used with sodium carbonate, which further decreases the cost of the final color.

I claim:

1. In the process for preparing dialkoxydibenzanthrones wherein a hydroxydibenzanthrone is alkylated in a nitrobenzene with a dialkyl sulfate of the class consisting of dimethyl sulfate and diethyl sulfates, the step which comprises carrying out the alkylation in the presence of a potassium carbonate.

2. The process for preparing dimethoxydibenzanthrone which comprises heating dihydroxydibenzanthrone in nitrobenzene with dimethyl sulfate and potassium carbonate at temperatures of from 60 to 160° C.

3. The process for preparing diethoxydibenzanthrone which comprises heating dihydroxydibenzanthrone in nitrobenzene with diethyl sulfate and potassium carbonate at temperatures of from about 180 to 185° C.

EDWARD T. HOWELL.